US012656754B2

(12) United States Patent　　　　(10) Patent No.:　US 12,656,754 B2

Watanabe　　　　　　　　　　　　　(45) Date of Patent:　　Jun. 16, 2026

(54) PROGRAMMING DEVICE AND MACHINE TOOL

(71) Applicant: FANUC CORPORATION, Yamanashi (JP)

(72) Inventor: Toshihiro Watanabe, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 566 days.

(21) Appl. No.: 18/245,718

(22) PCT Filed: Sep. 29, 2021

(86) PCT No.: PCT/JP2021/035830

§ 371 (c)(1),
(2) Date: Mar. 17, 2023

(87) PCT Pub. No.: WO2022/075142

PCT Pub. Date: Apr. 14, 2022

(65) Prior Publication Data

US 2023/0359166 A1　　　Nov. 9, 2023

(30) Foreign Application Priority Data

Oct. 5, 2020　　(JP) ................................. 2020-168586

(51) Int. Cl.
*G05B 19/408*　　　(2006.01)
*G05B 19/402*　　　(2006.01)

(52) U.S. Cl.
CPC ....... *G05B 19/4086* (2013.01); *G05B 19/402* (2013.01)

(58) Field of Classification Search
CPC .............. G05B 19/4086; G05B 19/402; G05B 2219/33258; G05B 2219/33263; Y02P 90/02
See application file for complete search history.

(56) References Cited

U.S. PATENT DOCUMENTS

| | | | | |
|---|---|---|---|---|
| 11,036,207 B2 * | 6/2021 | Kunis | ........................ | B23B 3/26 |
| 2007/0093930 A1 * | 4/2007 | Griggs | .............. | G05B 19/4097 |
| | | | | 700/181 |

(Continued)

FOREIGN PATENT DOCUMENTS

| | | |
|---|---|---|
| CN | 105988419 A | 10/2016 |
| CN | 109648585 A | 4/2019 |

(Continued)

OTHER PUBLICATIONS

International Search Report in PCT/JP2021/035830, mailed Dec. 14, 2021. 2pp.

*Primary Examiner* — Christopher E. Everett
(74) *Attorney, Agent, or Firm* — HAUPTMAN HAM, LLP

(57)　　　　　ABSTRACT
A programming device includes an information storage unit that stores, in association with identification information assigned to a tool, coordinate conversion information used to convert a coordinate value in a rotating coordinate system into a coordinate value in a reference coordinate system, an execution command generation unit that generates a coordinate conversion execution command based on the coordinate conversion information stored in association with the identification information, and a programming unit that creates a coordinate conversion program including the coordinate conversion execution command generated by the execution command generation unit.

5 Claims, 10 Drawing Sheets

(56) References Cited

U.S. PATENT DOCUMENTS

| | | | |
|---|---|---|---|
| 2016/0026169 A1* | 1/2016 | Sasaki | G05B 19/402 700/194 |
| 2016/0274560 A1 | 9/2016 | Nakajima | |
| 2016/0320772 A1 | 11/2016 | Ono et al. | |
| 2019/0105774 A1 | 4/2019 | Oyama et al. | |
| 2019/0271965 A1* | 9/2019 | Tsuda | G05B 19/4093 |
| 2021/0086267 A1* | 3/2021 | Hayashi | B23Q 15/12 |

FOREIGN PATENT DOCUMENTS

| | | | | |
|---|---|---|---|---|
| GB | 2089068 A * | 6/1982 | | G05B 19/404 |
| JP | H3-269604 A | 12/1991 | | |
| JP | H7-36526 A | 2/1995 | | |
| JP | 2009-301232 A | 12/2009 | | |
| WO | 2015097886 A1 | 7/2015 | | |

* cited by examiner

| TOOL NUMBER | TOOL TYPE | COORDINATE DIFFERENCE INFORMATION |
|---|---|---|
| ⋮ | ⋮ | ⋮ |
| 11 | DRILL | X:45 |
| 12 | TAP | X:45 |
| 13 | END MILL | Null |
| ⋮ | ⋮ | ⋮ |

FIG. 5

```
SWITCH(TOOL NUMBER)
  :    :
  :    :
 CASE  11:
    ROTX  DEG=45. 0
 CASE  12:
    ROTX  DEG=45. 0
 CASE  13:
    DO  NOTHING
  :    :
  :    :
```

| TOOL NUMBER | TOOL TYPE | REFERENCE MACHINING DIRECTION | CUTTING DIRECTION |
|---|---|---|---|
| ⋮ | ⋮ | ⋮ | ⋮ |
| 1 2 1 | TURNING TOOL | −X | Null |
| 1 2 2 | TURNING TOOL | −X | −Y |
| 1 2 3 | THREAD CUTTING | −X | Null |
| ⋮ | ⋮ | ⋮ | ⋮ |

FIG. 12

| TOOL NUMBER | TOOL TYPE | COORDINATE DIFFERENCE INFORMATION |
|---|---|---|
| ⋮ | ⋮ | ⋮ |
| 131 | TURNING TOOL | Null |
| 132 | TURNING TOOL | IF Y>0. 000 THEN Z:90 ELSE Z:270 |
| 133 | THREAD CUTTING | Null |
| ⋮ | ⋮ | ⋮ |

FIG. 13

```
SWITCH(TOOL NUMBER)
  ⋮  ⋮
  ⋮  ⋮
CASE 131:
   DO NOTHING
CASE 132:
   IF(Y>0. 0)
     ROTZ DEG=90. 0
   ELSE
     ROTZ DEG=270. 0
CASE 133:
   DO NOTHING
  ⋮  ⋮
  ⋮  ⋮
```

PROGRAMMING DEVICE AND MACHINE TOOL

RELATED APPLICATIONS

The present application is a National Phase of International Application No. PCT/JP2021/035830 filed Sep.29, 2021, which claims priority to Japanese Application No. 2020-168586, filed Oct. 5, 2020.

TECHNICAL FIELD

The present disclosure relates to a programming device and a machine tool.

BACKGROUND ART

Conventionally, a machining program is created in a numerical controller with a coordinate conversion function. In a numerical controller with a coordinate conversion function, for example, a machining program for instructing a movement path of a tool using coordinate values in a coordinate system obtained by rotating a reference coordinate system by a predetermined angle around a predetermined axis is created. In this case, coordinate values for instructing the movement path are converted into coordinate values in the reference coordinate system, and the movement of the tool is controlled based on the converted coordinate values.

CITATION LIST

Patent Literature

Patent Literature 1: JP 3-269604 A

SUMMARY OF INVENTION

Technical Problem

However, when creating a machining program for instructing coordinate conversion in a conventional numerical controller, it is necessary to write information such as a rotation center, a rotation direction, and a rotation amount of the coordinate system in the machining program. This makes the machining program more complex, and readability of the machining program may be deteriorated. In addition, such deterioration in the readability of the machining program may lead to machining errors of the workpiece.

An object of the present disclosure is to provide a programming device and a machine tool capable of improving readability of a machining program and reducing machining errors.

Solution to Problem

A programming device includes an information storage unit that stores, in association with identification information assigned to a tool, coordinate conversion information used to convert a coordinate value in a rotating coordinate system into a coordinate value in a reference coordinate system, an execution command generation unit that generates a coordinate conversion execution command based on the coordinate conversion information stored in the information storage unit, and a programming unit that creates a coordinate conversion program including the execution command generated by the execution command generation unit.

Advantageous Effect of Invention

According to the present disclosure, readability of a machining program can be improved and machining errors can be reduced.

BRIEF DESCRIPTION OF DRAWINGS

FIG. 5 is a diagram illustrating an example of a coordinate conversion program.

FIG. 6 is a diagram illustrating an example of a machining program.

FIG. 12 is a diagram illustrating an example of information stored in an information storage unit according to a third embodiment.

FIG. 13 is a diagram illustrating another example of the coordinate conversion program.

FIG. 14 is a diagram illustrating another example of the machining program.

DESCRIPTION OF EMBODIMENTS

First Embodiment

Hereinafter, a first embodiment will be described with reference to the drawings.

Figure 1:
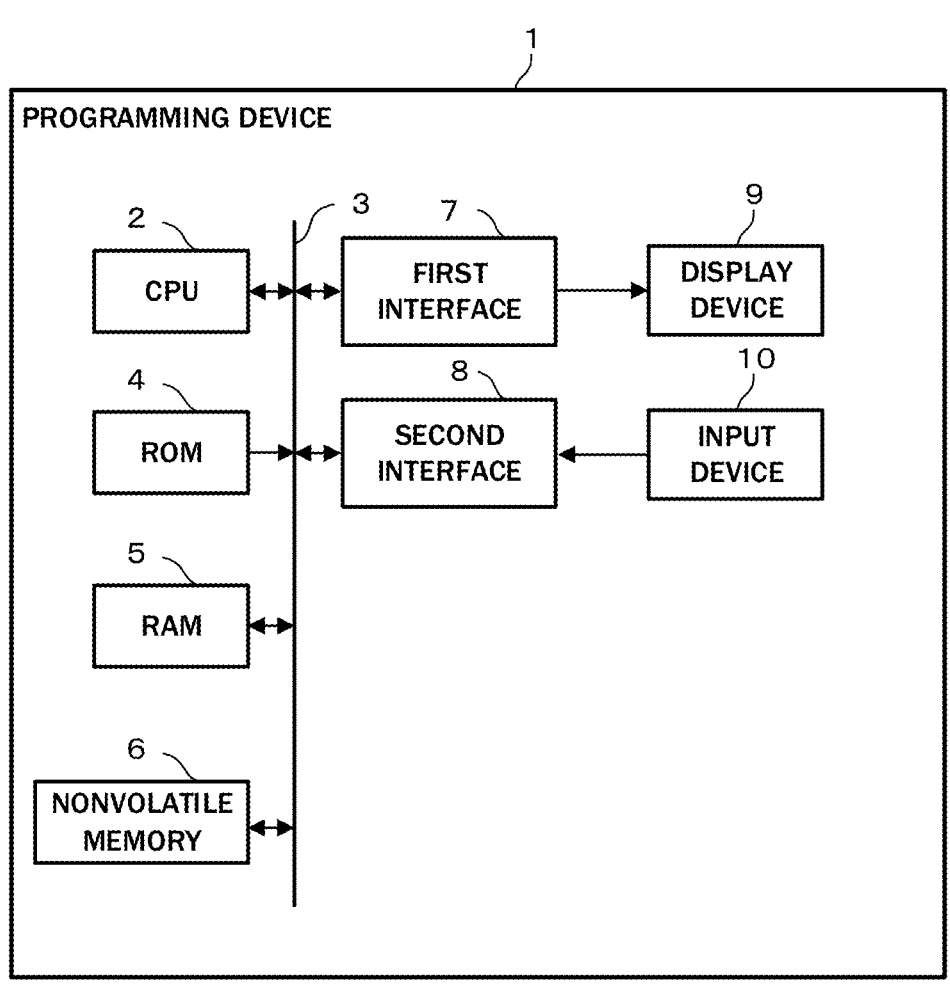
FIG. 1 is a diagram illustrating an example of a hardware configuration of a programming device.

FIG. 1 is a diagram illustrating an example of a hardware configuration of a programming device. The programming device 1 is, for example, a device that creates a coordinate conversion program for converting coordinate values instructed in a machining program. The programming device 1 is implemented in, for example, a personal computer (PC) or a numerical controller that controls a machine tool. Here, an example in which the programming device 1 is implemented in a PC will be described.

The programming device 1 includes a central processing unit (CPU) 2, a bus 3, a read only memory (ROM) 4, a random access memory (RAM) 5, and a nonvolatile memory 6.

The CPU 2 is a processor that controls the entire programming device 1 according to a system program. The CPU 2 reads a system program and the like stored in the ROM 4 via the bus 3.

The bus 3 is a communication path that connects the pieces of hardware in the programming device 1 to one another. Each piece of hardware in the programming device 1 exchanges data via the bus 3.

The ROM 4 is a storage device that stores a system program and the like for controlling the entire programming device 1.

The RAM 5 is a storage device that temporarily stores various data. The RAM 5 temporarily stores display data, data input from the outside, and the like. The RAM 5 functions as a work area for the CPU 2 to process various data.

The nonvolatile memory 6 is a storage device that holds data even in a state where the programming device 1 is powered off and power is not supplied to the programming device 1. The nonvolatile memory 6 includes, for example, a solid state drive (SSD). The nonvolatile memory 6 stores, for example, a coordinate conversion program created by the programming device 1 and various types of information input from an input device 10.

The programming device 1 further includes a first interface 7 and a second interface 8.

The first interface 7 is an interface that connects the bus 3 with the display device 9. The first interface 7 sends, for example, various data processed by the CPU 2 to the display device 9.

The display device 9 is a device that receives various data via the first interface 7 and displays the various data. The display device 9 displays, for example, a coordinate conversion program stored in the nonvolatile memory 6. The display device 9 is a display such as a liquid crystal display (LCD).

The second interface 8 is an interface that connects the bus 3 with the input device 10. The second interface 8 sends, for example, data input from the input device 10 to the CPU 2 via the bus 3.

The input device 10 is a device for inputting various data. For example, the input device 10 receives an input of the coordinate conversion information of each tool and sends the input information to the nonvolatile memory 6 via the second interface 8. The coordinate conversion information will be described in detail later. The input device 10 is, for example, a keyboard and a mouse. Note that the input device 10 and the display device 9 may be configured as one device such as a touch panel, for example.

Next, functions of the respective units of the programming device 1 will be described.

Figure 2:
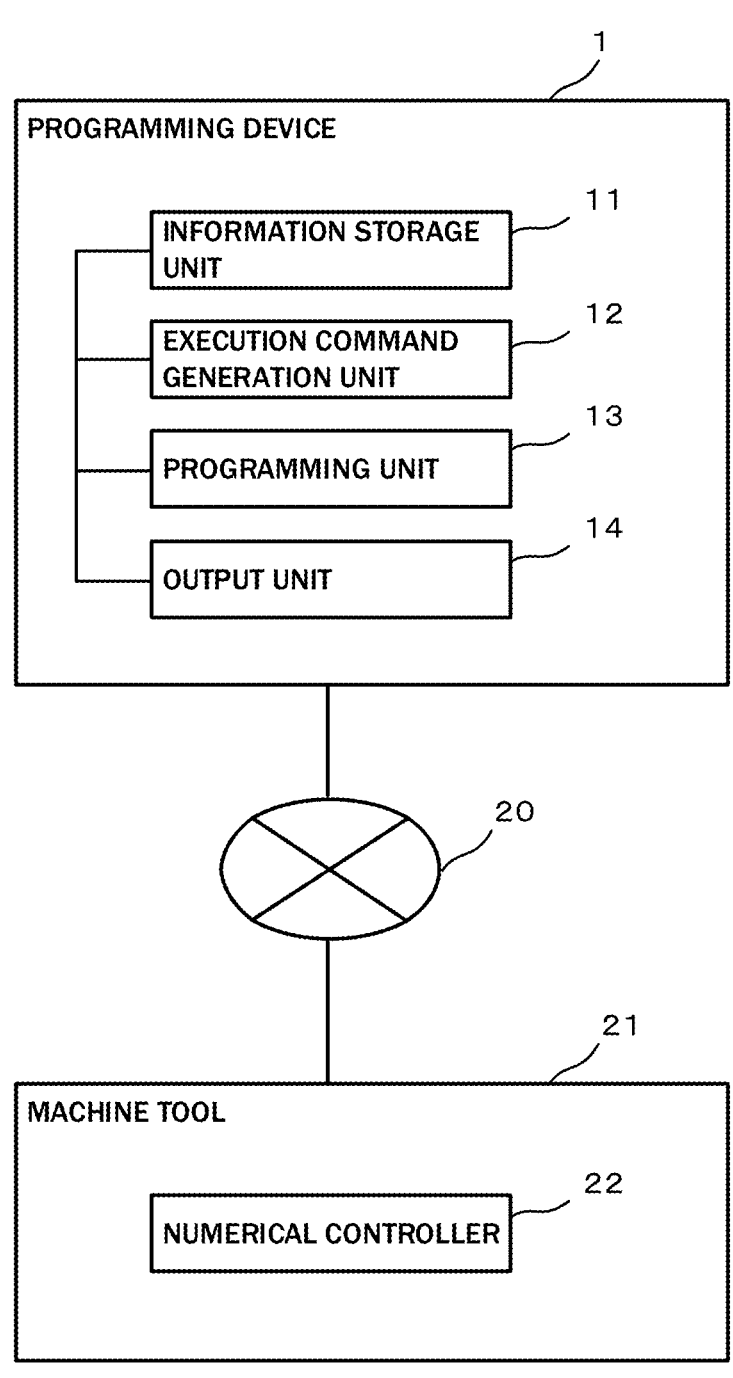
FIG. 2 is a block diagram illustrating an example of functions of the programming device.

FIG. 2 is a block diagram illustrating an example of functions of the programming device 1. The programming device 1 includes, for example, an information storage unit 11, an execution command generation unit 12, a programming unit 13, and an output unit 14.

The information storage unit 11 is realized by storing data input from the input device 10 or the like or a calculation result of calculation processing by the CPU 2 in the RAM 5 or the nonvolatile memory 6. In addition, the execution command generation unit 12, the programming unit 13, and the output unit 14 are realized, for example, by the CPU 2 performing calculation processing using the system program and various data stored in the ROM 4. The CPU 2 executes calculation processing using the RAM 5 as a work area.

The information storage unit 11 stores coordinate conversion information for converting a coordinate value in a rotating coordinate system into a coordinate value in a reference coordinate system.

The coordinate system is a generic term for an origin, coordinate axes, and the like serving as a reference for representing a position on the machine tool. The coordinate system is, for example, a three-axis orthogonal coordinate system including the X axis, the Y axis, and the Z axis orthogonal to one another.

Here, the machine tool will be described. The machine tool machines a workpiece based on a coordinate value in a reference coordinate system serving as a reference for controlling each axis. In a case where the machine tool is a machining center, the reference coordinate system is set such that, for example, the Z axis and the spindle are parallel, and the X axis and the Y axis are parallel to the movement direction of the table. In a case where the machine tool is a lathe, the reference coordinate system is set such that, for example, the Z axis and the spindle are parallel to each other, and the X axis and the Y axis are parallel to the moving direction of the tool post.

The rotating coordinate system is a coordinate system set in accordance with the orientation of the tool or the cutting direction of the tool, and is a coordinate system obtained by rotating the reference coordinate system by a predetermined angle around a predetermined axis. The rotating coordinate system may further be a coordinate system translated in a predetermined axial direction as necessary.

Figures 3, 4:
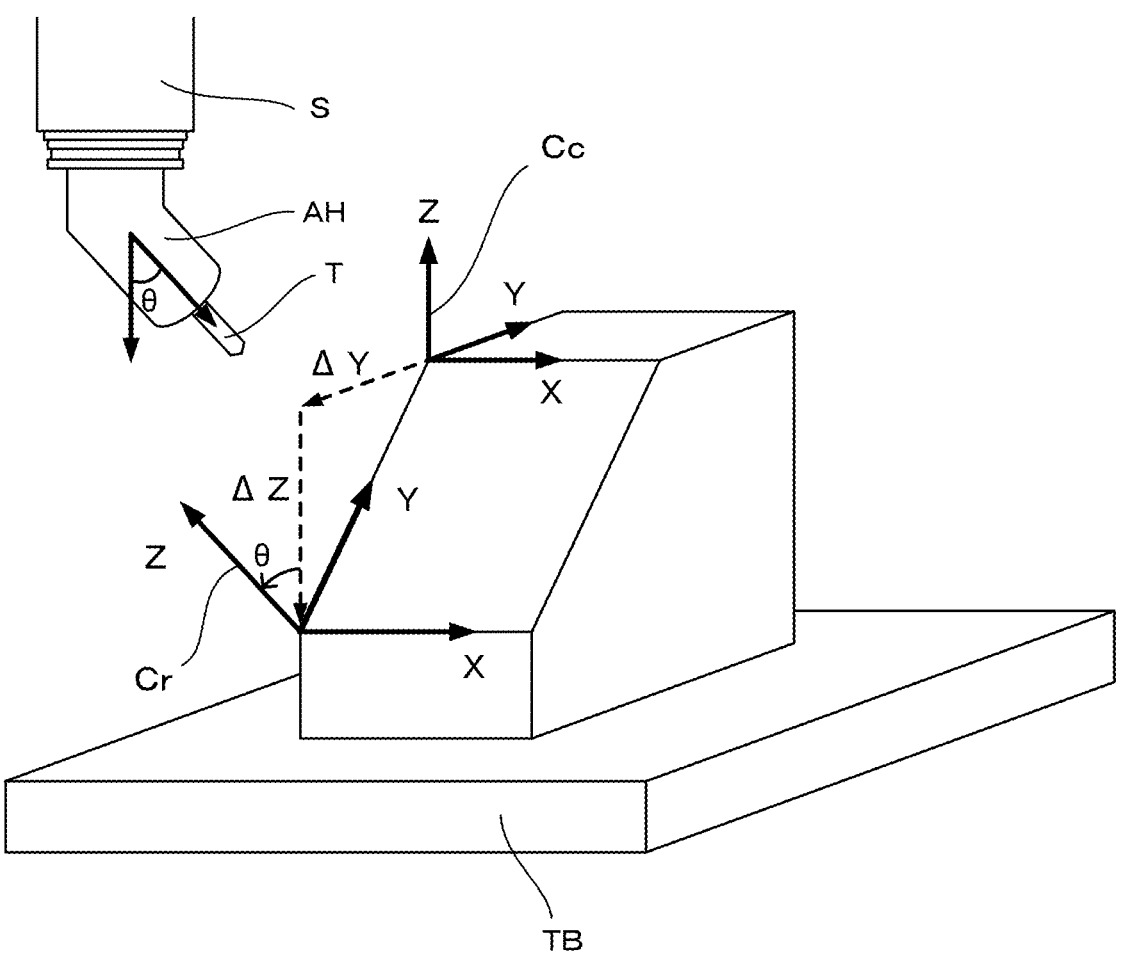
FIG. 3 is a diagram illustrating a relationship between a reference coordinate system and a rotating coordinate system.
FIG. 4 is a diagram illustrating an example of information stored in an information storage unit according to a first embodiment.

FIG. 3 is a diagram illustrating a relationship between a reference coordinate system and a rotating coordinate system. The Z axis of the reference coordinate system Cc is parallel to the longitudinal direction of the spindle S, and the X axis and the Y axis are parallel to the moving directions of the table TB. The Z axis of the rotating coordinate system Cr is parallel to the longitudinal direction of the tool T. The rotating coordinate system Cr is a coordinate system obtained by rotating the reference coordinate system Cc by an angle $\theta$ around the X axis. The origin of the reference coordinate system Cc and the origin of the rotating coordinate system Cr do not necessarily coincide with each other. The origin of the rotating coordinate system Cr may be a point obtained by translating the origin of the reference coordinate system Cc in the X-axis, Y-axis, and Z-axis directions by $\Delta X$, $\Delta Y$, and $\Delta Z$, respectively.

The coordinate conversion information is information for converting a coordinate value in the rotating coordinate system Cr into a coordinate value in the reference coordinate system Cc. The coordinate conversion information is, for example, coordinate difference information indicating a difference between the reference coordinate system Cc and the rotating coordinate system Cr. The coordinate difference information includes information indicating a rotation center and information indicating a rotation angle of the rotating coordinate system Cr. However, the coordinate difference information does not include the parallel translation amounts $\Delta X$, $\Delta Y$, and $\Delta Z$ from the origin of the reference coordinate system Cc to the origin of the rotating coordinate system Cr.

The coordinate conversion information is set according to the attachment direction of the tool T with respect to the spindle S. In the example illustrated in FIG. 3, the tool T is attached to an angle head AH for inclining by an angle $\theta$ around the X axis with respect to the spindle S. In this case, the coordinate conversion information includes information indicating the X axis, which is the rotation center of the rotating coordinate system Cr, and the angle $\theta$.

The information storage unit 11 also stores the coordinate conversion information in association with the unique identification information assigned to each tool T. The unique identification information assigned to the tool T is, for example, a tool number of each tool T. The information storage unit 11 may store information indicating the tool type in association with identification information unique to each tool T.

FIG. 4 is a diagram illustrating an example of information stored in the information storage unit 11. The information storage unit 11 stores information indicating a tool type and coordinate conversion information in association with tool numbers.

Specifically, the tool number 11 is stored in association with "drill" as the tool type, and "X: 45" as the coordinate conversion information. "X: 45" indicates that the rotating coordinate system Cr is rotated by 45 degrees around the X axis of the reference coordinate system Cc. In other words, it is indicated that the tool T is attached in a direction rotated by 45 degrees around the X axis with respect to the longitudinal direction of the spindle S.

The tool number 12 is stored in association with "tap" as a tool type and "X: 45" as coordinate conversion information.

The tool number 13 is stored in association with "end mill" as a tool type and "Null" as coordinate conversion information. "Null" indicates that there is no difference between the rotating coordinate system Cr and the reference coordinate system Cc, and the tool T is attached so that the longitudinal direction of the tool T is in parallel with the longitudinal direction of the spindle S.

The coordinate conversion information is input from the input device 10 by the user, for example, and is stored in the information storage unit 11.

Here, the description returns to FIG. 2.

The execution command generation unit 12 generates a coordinate conversion execution command for each piece of identification information based on the coordinate conversion information stored in the information storage unit 11. For example, in a case where the information illustrated in FIG. 4 is stored in the information storage unit 11, the execution command generation unit 12 generates an execution command "ROTX DEG=45.0" for coordinate conversion of rotating the coordinate value for instructing the movement path of the drill of the tool number 11 by 45 degrees around the X axis. In other words, the execution command generation unit 12 generates a coordinate conversion execution command that converts a coordinate value in the rotating coordinate system Cr rotated by 45 degrees around the X axis with respect to the reference coordinate system Cc into a coordinate value in the reference coordinate system Cc.

The execution command generation unit 12 also generates an execution command "ROTX DEG=45.0" for coordinate conversion of rotating the coordinate values instructing the movement path of the tap with the tool number 12 by 45 degrees around the X axis.

On the other hand, the tool number 13 is stored in association with the coordinate conversion information "Null". Therefore, the execution command generation unit 12 generates the execution command "DO NOTHING" that does not convert the coordinate value instructing the movement path of the end mill with the tool number 13.

Here, the description returns to FIG. 2.

The programming unit 13 creates a coordinate conversion program including the instruction to execute coordinate conversion generated by the execution command generation unit 12.

Figures 5, 6:
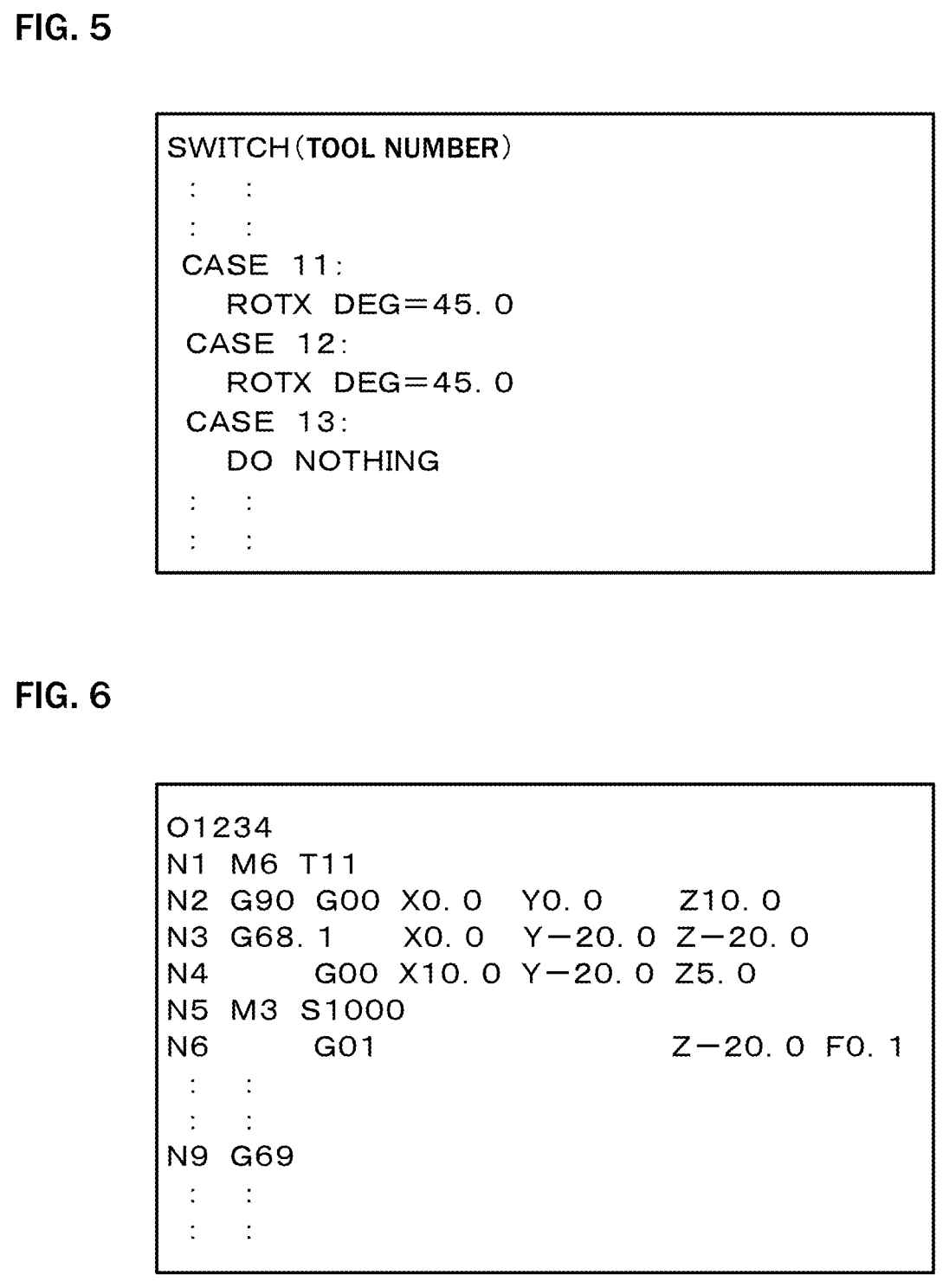

FIG. 5 is a diagram illustrating an example of the coordinate conversion program created by the programming unit 13. The coordinate conversion program illustrated in FIG. 5 is generated when the information illustrated in FIG. 4 is stored in the information storage unit 11.

In this coordinate conversion program, an execution command to be executed corresponding to the identification information is defined by the SWITCH statement.

Specifically, a coordinate conversion execution command for rotating the coordinate value by 45 degrees around the X axis is defined for the tool with the tool number 11. A coordinate conversion execution command for rotating the coordinate value by 45 degrees around the X axis is defined for the tool with the tool number 12. An execution command for not converting coordinate values is defined for the tool with the tool number 13.

The output unit 14 outputs the coordinate conversion program generated by the programming unit 13. The output unit 14 outputs the coordinate conversion program to the numerical controller 22 of the machine tool 21 connected to the programming device 1 via the Internet line 20, for example.

Here, the numerical controller 22 will be described. The numerical controller 22 is a device that controls each axis of the machine tool 21 according to a machining program to perform machining a workpiece.

FIG. 6 is a diagram illustrating an example of the machining program executed in the numerical controller 22.

A command "M6 T11" in the first line is a tool exchange command for the tool T with the tool number 11.

The commands "G90" and "G00 X0.0 Y0.0 Z10.0" in the second line are an absolute command and a positioning command of the tool T, respectively. These commands are commands for positioning the tool T at positions (0.0, 0.0, 10.0) in the reference coordinate system Cc.

The commands "G68.1" and "X0.0 Y−20.0 Z−20.0" in the third line respectively indicate the coordinate conversion command and the parallel translation amount from the origin of the reference coordinate system Cc to the origin of the rotating coordinate system Cr. This parallel translation amount is designated by a coordinate value in the reference coordinate system Cc. In addition, in a case where only "G68.1" is specified, it is assumed that there is no parallel translation amount. In other words, the origin of the reference coordinate system Cc coincides with the origin of the rotating coordinate system Cr. The coordinate conversion command is a command for converting the coordinate values into coordinate values in the reference coordinate system Cc until the coordinate conversion is canceled. In other words, the coordinate values written between the coordinate conversion command and the coordinate conversion cancel command are coordinate values in the rotating coordinate system Cr, and are converted into coordinate values in the reference coordinate system Cc according to the coordinate conversion execution command.

A command "G00 X10.0 Y−20.0 Z5.0" in the fourth line is a positioning command. The coordinate value in the positioning command is a coordinate value in the rotating coordinate system Cr.

A command "M3 S1000" in the fifth line is a spindle forward rotation command. The spindle forward rotation command is a command to rotate the spindle S forward at a rotation speed of 1,000 [rpm].

A command "G01 Z−20.0 F0.1" in the sixth line is a linear interpolation command. This linear interpolation command is a command to move the tool T to a position of Z: −20.0 at a feed speed of 0.1 [mm/rev].

A command "G69" in the ninth line is a coordinate conversion cancel command. This command cancels the coordinate conversion.

The numerical controller 22 acquires these pieces of machining command information from the machining program.

Next, the following will describe processing in a case where the numerical controller 22 reads the coordinate conversion program from the programming device 1 and further the machining program is executed.

For example, when the numerical controller 22 reads the coordinate conversion program illustrated in FIG. 5 and executes the machining program illustrated in FIG. 6, the numerical controller 22 converts the coordinate values indicating the movement path of the tool T with the tool number 11 based on the coordinate conversion program.

Specifically, when the coordinate conversion command "G68.1" is read, the numerical controller 22 converts the coordinate value (10.0, −20.0, 5.0) in the positioning command and the coordinate value (10.0, −20.0, −20.0) in the linear interpolation command of the tool T with the tool number 11 based on the execution command "ROTX DEG=45.0" and the parallel translation amount "X0.0 Y−20.0 Z−20.0" from the origin of the reference coordinate system Cc. In other words, the numerical controller 22 rotates the coordinate values (10.0, −20.0, 5.0) and the coordinate values (10.0, −20.0, −20.0) by 45 degrees around the X axis and translates the coordinate values by 0.0, −20.0, and −20.0 in the X axis, Y axis, and Z axis directions, respectively, thereby converting the coordinate values from the coordinate values in the rotating coordinate system Cr to the coordinate values in the reference coordinate system Cc.

For example, the numerical controller 22 generates a coordinate conversion matrix for converting a coordinate value in the rotating coordinate system Cr into a coordinate value in the reference coordinate system Cc based on an execution command included in the coordinate conversion program. In a case where the rotating coordinate system Cr is a coordinate system rotated by an angle θ around the X axis with respect to the reference coordinate system Cc, the numerical controller 22 multiplies a coordinate value defined by the machining program by a coordinate conversion matrix $R_x(\theta)$ expressed by the following Formula 1. With this configuration, the coordinate values in the rotating coordinate system Cr acquired from the machining program can be converted into the coordinate values in the reference coordinate system Cc.

$$R_x(\theta) = \begin{bmatrix} 1 & 0 & 0 \\ 0 & \cos\theta & -\sin\theta \\ 0 & \sin\theta & \cos\theta \end{bmatrix} \qquad \text{[Formula 1]}$$

The numerical controller 22 controls each axis based on the coordinate values in the reference coordinate system Cc. When the coordinate conversion command is specified in the machining program, the numerical controller 22 controls the movement of the tool T based on the converted coordinate values.

Next, the following will describe processing executed in the programming device 1 when the coordinate conversion program is created.

Figure 7:
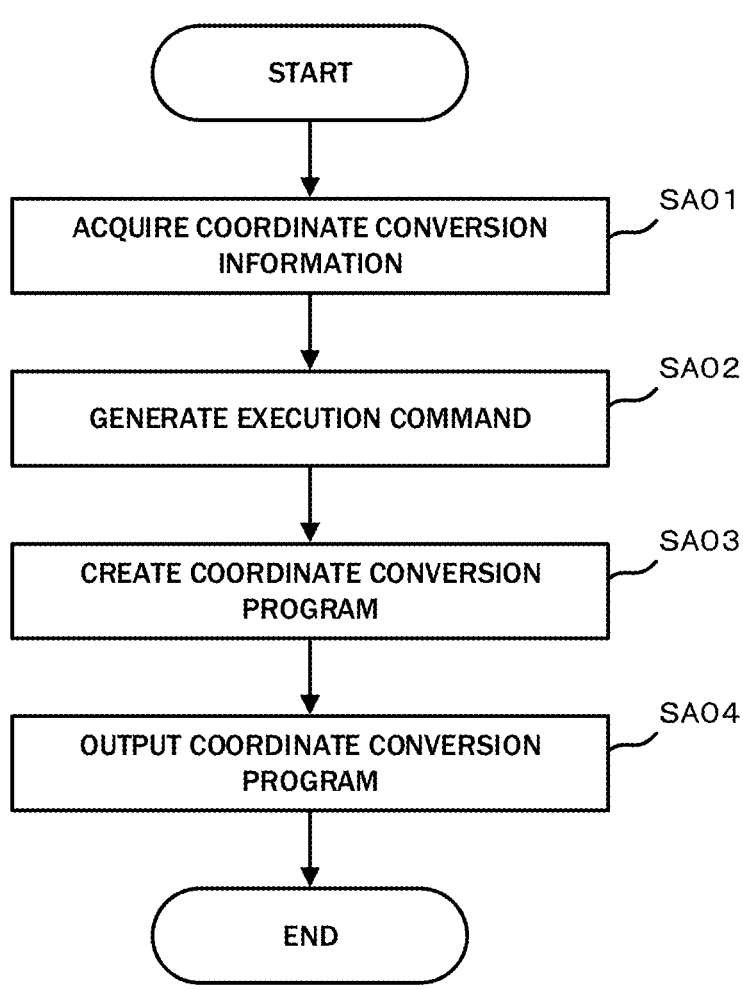
FIG. 7 is a flowchart illustrating an example of processing executed at the time of machining a workpiece.

FIG. 7 is a flowchart illustrating processing executed in the programming device 1 when the coordinate conversion program is created.

First, the execution command generation unit 12 acquires the coordinate conversion information stored in the information storage unit 11 (step SA01).

Next, the execution command generation unit 12 generates an execution command for coordinate conversion for each piece of identification information based on the acquired coordinate conversion information (step SA02).

Next, the programming unit 13 creates a coordinate conversion program based on the coordinate conversion execution command for each piece of the identification information generated by the execution command generation unit 12 (step SA03).

Finally, the output unit 14 outputs the coordinate conversion program created by the programming unit 13. (Step SA04).

As described above, the programming device 1 according to the first embodiment includes the information storage unit 11 that stores the coordinate conversion information for converting the coordinate value in the rotating coordinate system into the coordinate value in the reference coordinate system in association with the identification information assigned to the tool, the execution command generation unit 12 that generates the execution command of the coordinate conversion based on the coordinate conversion information stored in the information storage unit 11, and the programming unit 13 that creates a coordinate conversion program including the execution command generated by the execution command generation unit 12.

Therefore, it is not necessary to write, in the machining program, information such as the rotation center, the rotation direction, and the rotation amount of the coordinate system for coordinate conversion. With this configuration, readability of the machining program can be improved, and machining errors can be reduced.

In addition, in the programming device 1 according to the first embodiment, the coordinate conversion information includes coordinate difference information indicating a difference between the rotating coordinate system and the reference coordinate system, and the execution command generation unit 12 generates the execution command based on the coordinate difference information. Therefore, the information stored in the information storage unit 11 can be simplified.

Second Embodiment

Hereinafter, a second embodiment will be described with reference to the drawings. Note that description of the same configuration as that of the first embodiment will be omitted.

As illustrated in FIG. 2, the programming device 1 includes, for example, the information storage unit 11, the execution command generation unit 12, the programming unit 13, and the output unit 14.

The information storage unit 11 stores coordinate conversion information for converting a coordinate value in the rotating coordinate system Cr into a coordinate value in the reference coordinate system Cc. The coordinate conversion information includes reference direction information and cutting direction information.

The reference direction information is information indicating a reference machining direction determined according to the tool type. For example, when the tool T is a turning tool such as a cutting tool, the reference machining direction is the −X direction in the reference coordinate system Cc.

The cutting direction information is information indicating the cutting direction of the tool T. For example, when the turning tool is attached substantially parallel to the X-Z plane in the reference coordinate system Cc and the cutting is performed in the −X direction, the cutting direction of the turning tool is the –X direction. In this case, the reference machining direction coincides with the cutting direction of the tool T.

On the other hand, when the turning tool is attached substantially parallel to the Y-Z plane in the reference coordinate system Cc and the cutting is performed in the –Y direction, the cutting direction of the turning tool is the –Y direction. In this case, the cutting direction of the tool is a direction obtained by rotating the reference machining direction by 90 degrees around the Z axis.

Figures 8, 9:
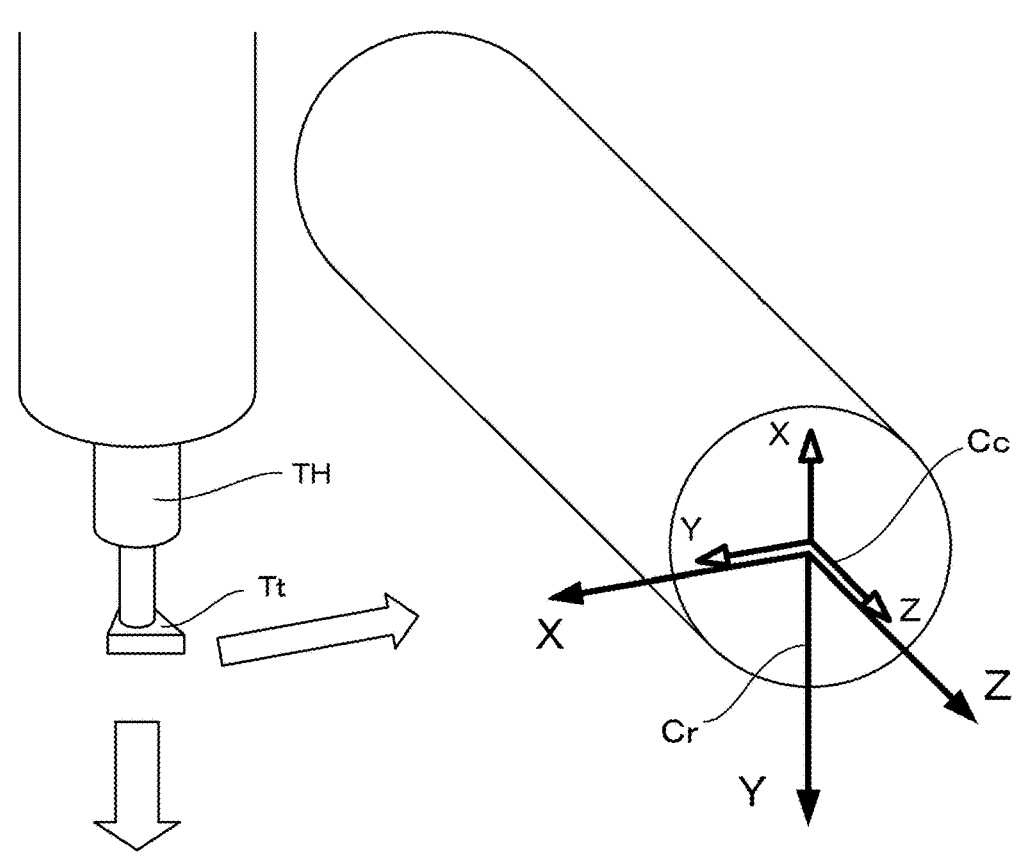
FIG. 8 is a diagram for explaining a reference machining direction and a cutting direction.
FIG. 9 is a diagram illustrating an example of information stored in an information storage unit according to a second embodiment.

FIG. 8 is a diagram for explaining a reference machining direction and a cutting direction. In FIG. 8, a turning tool Tt is attached to the tool holder TH. In this case, the reference machining direction is the –X direction in the reference coordinate system Cc. Further, the turning tool Tt is attached substantially parallel to the Y-Z plane in the reference coordinate system Cc, and the turning tool Tt cuts in the –Y direction during machining of the workpiece. Thus, the cutting direction of the turning tool Tt is a direction obtained by rotating the reference machining direction by 90 degrees around the Z axis.

FIG. 9 is a diagram illustrating an example of information stored in the information storage unit 11. The information storage unit 11 stores information indicating a tool type, reference direction information, and cutting direction information in association with the tool number.

Specifically, the tool number 121 is stored in association with "turning" as the tool type, "–X" as the reference direction information, and "Null" as the cutting direction information. In this case, the cutting direction of the tool T is the same –X direction as the reference machining direction.

The tool number 122 is stored in association with "turning" as a tool type, "–X" as reference direction information, and "–Y" as cutting direction information. In this case, the tool T is attached substantially parallel to the Y-Z plane in the reference coordinate system Cc, and is cut in the –Y direction.

The tool number 123 is stored in association with "thread cutting" as a tool type, "–X" as reference direction information, and "Null" as cutting direction information. In this case, the cutting direction of the thread cutting tool coincides with the reference machining direction.

The execution command generation unit 12 (see FIG. 2) generates a coordinate conversion execution command based on the difference between the direction indicated by the reference direction information stored in the information storage unit 11 and the direction indicated by the cutting direction information.

For example, when the information illustrated in FIG. 9 is stored in the information storage unit 11, the execution command generation unit 12 generates a coordinate conversion execution command based on the reference direction information "–X" and the cutting direction information "–Y" associated with the tool number 122. Here, the difference between the cutting direction of the turning tool Tt with the tool number 122 and the reference machining direction is 90 degrees around the Z axis. In this case, the rotating coordinate system Cr is a coordinate system obtained by rotating the reference coordinate system Cc by 90 degrees around the Z axis. Therefore, the execution command generation unit 12 generates the execution command "ROTI DEG=90.0" for coordinate conversion of rotating the coordinate value instructing the movement path of the turning tool Tt with the tool number 122 by 90 degrees around the Z axis. In other words, the execution command generation unit 12 generates a coordinate conversion execution command that converts a coordinate value in the rotating coordinate system Cr rotated by 90 degrees around the Z axis with respect to the reference coordinate system Cc into a coordinate value in the reference coordinate system Cc.

Since the cutting direction information on the turning tool Tt with the tool number 121 and the thread-cutting tool with the tool number 123 is "Null", the execution command generation unit 12 generates an execution command "DO NOTHING" not to convert the coordinate values indicating the movement paths of the turning tool Tt with the tool number 121 and the thread-cutting tool with the tool number 123.

The programming unit 13 generates a program including a coordinate conversion execution command generated for each piece of identification information by the execution command generation unit 12.

The output unit 14 outputs the coordinate conversion program generated by the programming unit 13. The output unit 14 outputs the coordinate conversion program to, for example, the numerical controller 22 connected to the programming device 1 via an Internet line.

As described above, in the programming device 1 according to the second embodiment, the coordinate conversion information includes the reference direction information indicating the machining direction serving as the reference of the tool T and the cutting direction information indicating the cutting direction of the tool T set for each piece of the identification information, and the execution command generation unit 12 generates the execution command based on the difference between the direction indicated by the reference direction information and the direction indicated by the cutting direction information.

Therefore, it is not necessary to write, in the machining program, information such as the rotation center, the rotation direction, and the rotation amount of the coordinate system for coordinate conversion. With this configuration, readability of the machining program can be improved, and machining errors can be reduced.

Third Embodiment

Hereinafter, a third embodiment will be described with reference to the drawings. Note that description of the same configuration as that of the first embodiment will be omitted.

As illustrated in FIG. 2, the programming device 1 includes, for example, the information storage unit 11, the execution command generation unit 12, the programming unit 13, and the output unit 14.

The information storage unit 11 stores coordinate conversion information for converting a coordinate value in the rotating coordinate system Cr into a coordinate value in the reference coordinate system Cc. The coordinate conversion information includes coordinate difference information indicating a difference between the reference coordinate system Cc and the rotating coordinate system Cr.

The coordinate difference information includes, for example, information indicating a rotation center of the rotating coordinate system Cr and information indicating a rotation angle. In addition, in the coordinate difference information, the information indicating the rotation center of the rotating coordinate system Cr and the information indicating the rotation angle can be determined corresponding to the position information indicating the position at the start of cutting of the tool T.

Figure 10:
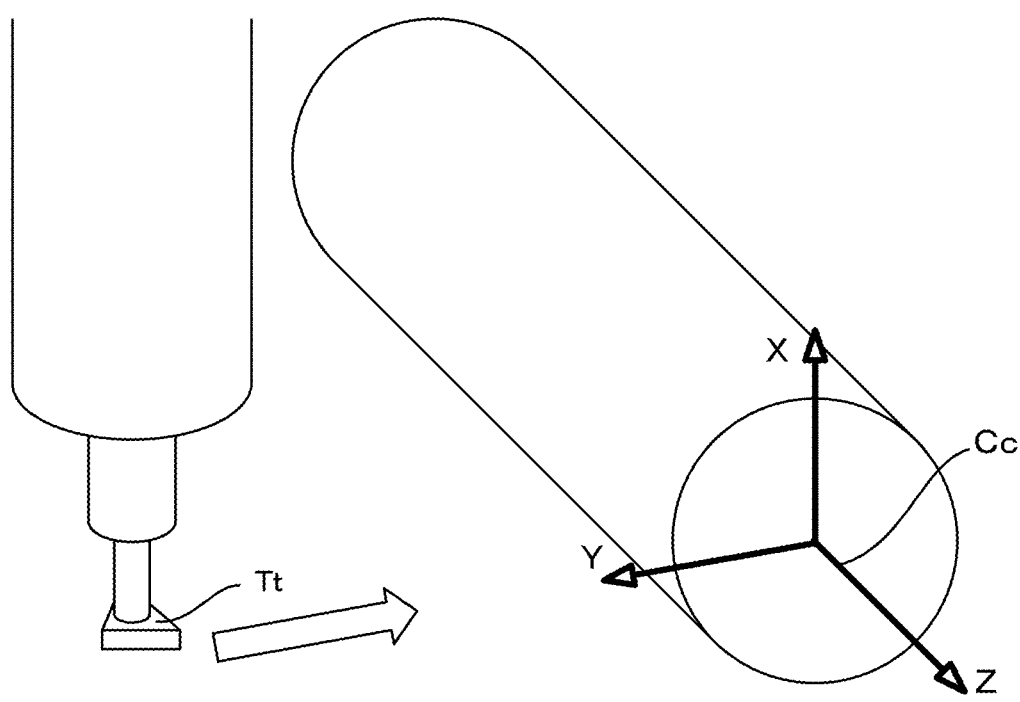
FIG. 10 is a diagram for explaining positioning of a tool.

For example, when the position information indicating the position of the turning tool is Y>0.0, the coordinate difference information is Z: 90. The case where the positional information is Y>0.0 is, for example, a case where the turning tool Tt is positioned on the +Y side in the Y-Z plane of the reference coordinate system Cc at the start of cutting as illustrated in FIG. 10. In this case, the cutting direction of the tool T is the −Y direction.

Figure 11:
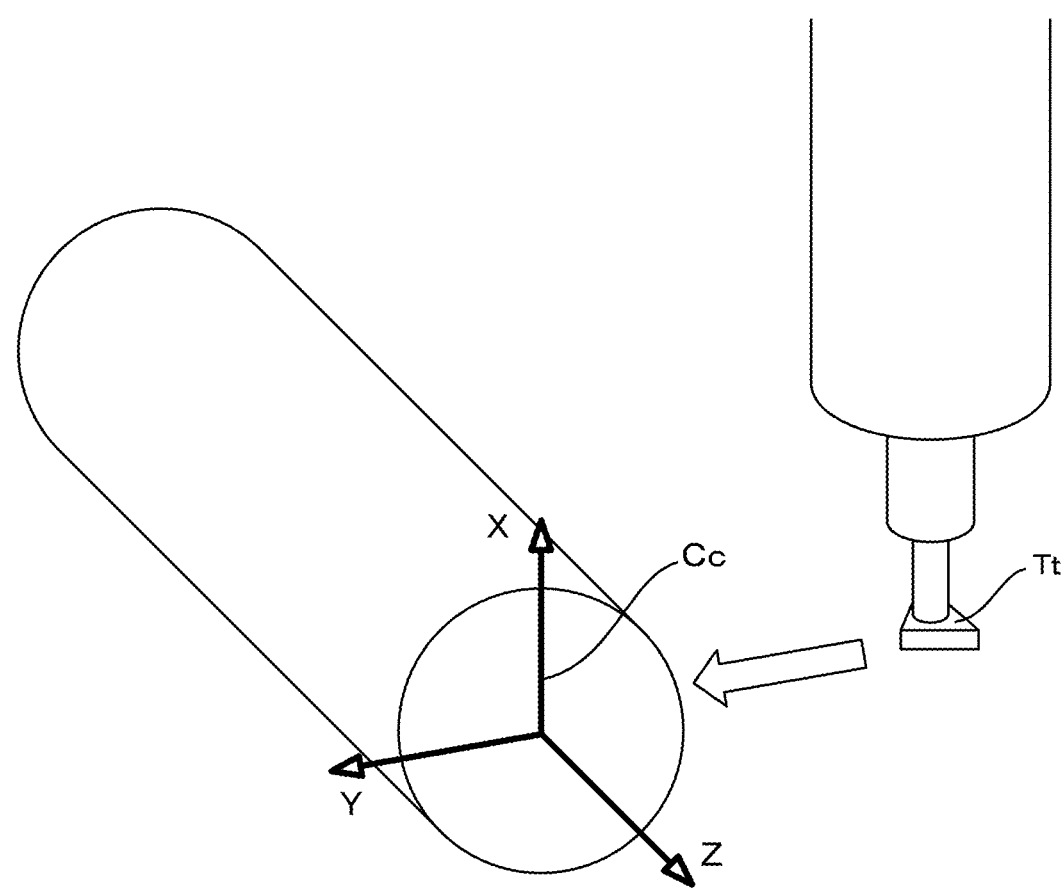
FIG. 11 is a diagram for explaining positioning of a tool.

On the other hand, when the position information indicating the position of the turning tool is Y<0.0, the coordinate difference information is Z: 270. The case where the positional information is Y<0.0 is, for example, a case where the turning tool Tt is positioned on the −Y side in the Y-Z plane of the reference coordinate system Cc at the start of cutting as illustrated in FIG. 11. In this case, the cutting direction of the tool T is the +Y direction.

FIG. 12 is a diagram illustrating an example of the information stored in the information storage unit 11. Information indicating a tool type and coordinate difference information are stored in the information storage unit 11 in association with a tool number.

Specifically, the tool number 131 is stored in association with "turning" as the tool type and "Null" as the coordinate difference information. In this case, coordinate conversion of coordinate values instructing the movement path of the tool T with the tool number 131 is not performed.

The tool number 132 is stored in association with "turning" as the tool type, and "IF Y>0.0", "THEN Z: 90", and "ELSE Z: 270" as the tool difference information. In other words, when the position information of the tool T is Y>0.0, the rotating coordinate system Cr rotated by 90 degrees around the Z axis with respect to the reference coordinate system Cc is set. In addition, in a case where the position information of the tool is Y<0.0, the rotating coordinate system Cr rotated by 270 degrees around the Z axis with respect to the reference coordinate system Cc is set.

The tool number 133 is stored in association with "thread cutting" as the tool type and "Null" as the tool conversion information.

The execution command generation unit 12 (see FIG. 2) generates an execution command for coordinate conversion for each piece of identification information based on the coordinate conversion information stored in the information storage unit 11. For example, when the information illustrated in FIG. 12 is stored in the information storage unit 11, the execution command generation unit 12 generates an execution command "DO NOTHING" not to convert the coordinate value for instructing the movement path of the turning tool with the tool number 131.

The execution command generation unit 12 also generates an execution command "ROTZ DEG=90.0" to rotate the coordinate values indicating the turning movement path of the tool number 132 by 90 degrees around the Z axis or an execution command "ROTZ DEG=270.0" to rotate the coordinate values indicating the turning movement path of the tool number 132 by 270 degrees around the Z axis according to the position where the tool is positioned.

Further, the execution command generation unit 12 also generates an execution command "DO NOTHING" that does not convert the coordinate values instructing the thread-cutting movement path with the tool number 133.

The programming unit 13 generates a program including a coordinate conversion execution command generated for each piece of the identification information by the execution command generation unit 12.

FIG. 13 is a diagram illustrating an example of the coordinate conversion program generated by the programming unit 13. The coordinate conversion program illustrated in FIG. 13 is generated when the information illustrated in FIG. 12 is stored in the information storage unit 11. In this coordinate conversion program, an execution command to be executed corresponding to the identification information is defined by the SWITCH statement.

Specifically, it is specified that the coordinate conversion is not performed on the coordinate value instructing the movement path of the tool of the tool number 131.

For the tool with the tool number 132, it is specified that the coordinate value is rotated by 90 degrees around the Z axis when the tool T is positioned on the +Y side in the reference coordinate system Cc, and the coordinate value is rotated by −270 degrees around the Z axis when the tool T is positioned on the −Y side in the reference coordinate system Cc.

In addition, it is specified that coordinate conversion is not performed on the coordinate values instructing the movement path of the tool of the tool number 132.

The output unit 14 outputs the coordinate conversion program generated by the programming unit 13. The output unit 14 outputs the coordinate conversion program to, for example, the numerical controller 22 connected to the programming device 1 via an Internet line.

Figure 14:
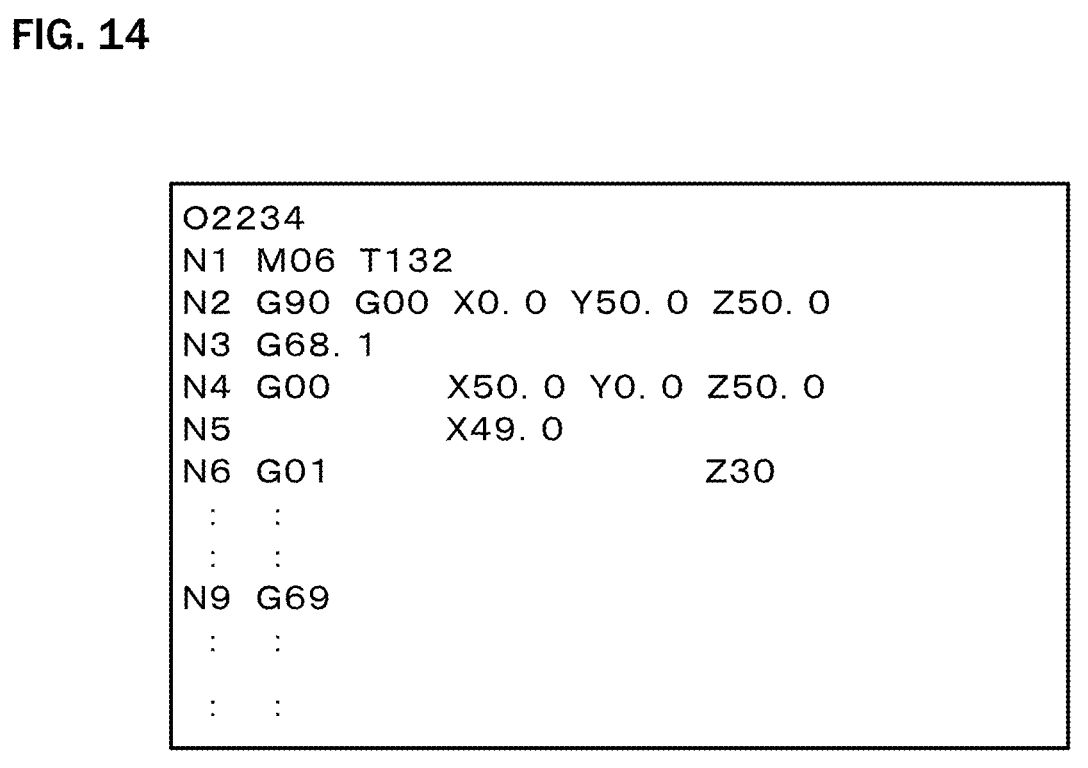

For example, when the numerical controller 22 reads the coordinate conversion program illustrated in FIG. 13 and executes the machining program illustrated in FIG. 14, the numerical controller 22 converts the coordinate values indicating the movement path of the tool T with the tool number 133 based on the coordinate conversion program.

Specifically, when the coordinate conversion command "G68.1" is read, the numerical controller 22 converts the coordinate values in the positioning command and the linear interpolation command based on the position information indicating the position of the tool T. Here, when the coordinate conversion command is read, the tool T is positioned on the +Y side. That is, the position information is Y>0.0. Therefore, the numerical controller 22 performs coordinate conversion of coordinate values indicating the movement path of the tool with the tool number 132 based on the execution command "ROTZ DEG=90.0". In other words, the numerical controller 22 rotates the coordinate values indicating the movement path of the tool with the tool number 132 by 90 degrees around the Z axis, thereby converting the coordinate values from the coordinate values in the rotating coordinate system Cr to the coordinate values in the reference coordinate system Cc.

As described above, in the programming device 1 according to the third embodiment, the coordinate conversion information includes the coordinate difference information indicating the difference between the rotating coordinate system and the reference coordinate system, and the coordinate difference information is determined for each piece of the position information indicating the position of the tool.

Therefore, it is not necessary to write information related to the coordinate system for coordinate conversion in the machining program. With this configuration, readability of the machining program can be improved, and machining errors can be reduced.

In the first to third embodiments described above, the example in which the programming device 1 is implemented in the PC has been described, but the programming device 1 may be implemented in the numerical controller 22 of the machine tool 21. Furthermore, the configurations in the above-described first to third embodiments may be appropriately combined.

REFERENCE SIGNS LIST

1 Programming device
2 CPU

3 Bus
4 ROM
5 RAM
6 Nonvolatile memory
7 First interface
8 Second interface
9 Display device
10 Input device
11 Information storage unit
12 Execution command generation unit
13 Programming unit
14 Output unit
20 Internet line
21 Machine tool
22 Numerical controller
AH Angle head
Cc Reference coordinate system
Cr Rotating coordinate system
S Spindle
TB Table
T Tool
Tt Turning tool
TH Tool holder

The invention claimed is:

1. A programming device for creating a program to control a machine tool, the programming device comprising: a processor and a memory, wherein the memory stores, in association with identification information assigned to a tool of the machine tool, coordinate conversion information to convert a coordinate value in a rotating coordinate system into a coordinate value in a reference coordinate system, and the processor is configured to generate a coordinate conversion execution command based on the coordinate conversion information stored in association with the identification information; and create a coordinate conversion program including the coordinate conversion execution command generated by the processor, wherein the coordinate conversion program is executed by a control device to control movement of the tool of the machine tool, and wherein the coordinate conversion information includes coordinate difference information indicating a difference between the rotating coordinate system and the reference coordinate system.

2. The programming device according to claim 1, wherein the coordinate conversion information includes reference direction information indicating machining direction as a reference of the tool which is set for each piece of the identification information, and cutting direction information indicating a cutting direction of the tool.

3. A machine tool comprising the programing device according to claim 1.

4. A programming device for creating a program to control a machine tool, the programming device comprising: a processor and a memory, wherein the memory stores, in association with identification information assigned to a tool of the machine tool, coordinate conversion information to convert a coordinate value in a rotating coordinate system into a coordinate value in a reference coordinate system, and the processor is configured to generate a coordinate conversion execution command based on the coordinate conversion information stored in association with the identification information; and create a coordinate conversion program including the coordinate conversion execution command generated by the processor, wherein the coordinate conversion program is executed by a control device to control movement of the tool of the machine tool, and wherein the coordinate conversion information includes coordinate difference information indicating a difference between the rotating coordinate system and the reference coordinate system, and the coordinate difference information is defined for each piece of position information indicating a position of the tool.

5. A machine tool comprising the programing device according to claim 4.

* * * * *